United States Patent [19]

Downs

[11] 4,170,072
[45] Oct. 9, 1979

[54] FUEL INJECTOR ADJUSTMENT FIXTURE

[75] Inventor: Ronald Downs, Seymour, Ind.

[73] Assignee: Cummins Engine Company, Inc., Columbus, Ind.

[21] Appl. No.: 661,079

[22] Filed: Feb. 25, 1976

[51] Int. Cl.² .............................................. G01B 3/22
[52] U.S. Cl. ................................ 33/172 R; 33/174 R; 33/180 AT
[58] Field of Search ............. 33/172 R, 169 R, 169 B, 33/174 R, 180 AT

[56] References Cited

U.S. PATENT DOCUMENTS

| | | | |
|---|---|---|---|
| 812,042 | 2/1906 | Hudson | 33/172 R |
| 2,366,645 | 1/1945 | Ollendorff | 33/172 R |
| 3,307,266 | 3/1967 | Miserocchi | 33/172 R |

*Primary Examiner*—Richard E. Aegerter

*Attorney, Agent, or Firm*—Gary M. Gron; Robert T. Ruff

[57] ABSTRACT

The disclosure illustrates a fixture permitting the adjustment of a stop which limits the upward travel of a unit type fuel injector plunger. The fixture comprises parallel rails having cross bars for clamping the injector to be adjusted with a given preload. An upper cross bar receives a displaceable rod adapted to be received in a socket in the injector for depressing the plunger. An arm having a given weight at its free end is pivotally mounted to the upper cross arm. The arm is pivoted downward to depress the plunger to its bottom-most position. A dial gauge indicates linear displacement of the rod and the plunger to a desired upper limit of travel where the stop is positioned. The predetermined weight at the end of the arm permits repeatable checking of the adjustment.

2 Claims, 4 Drawing Figures

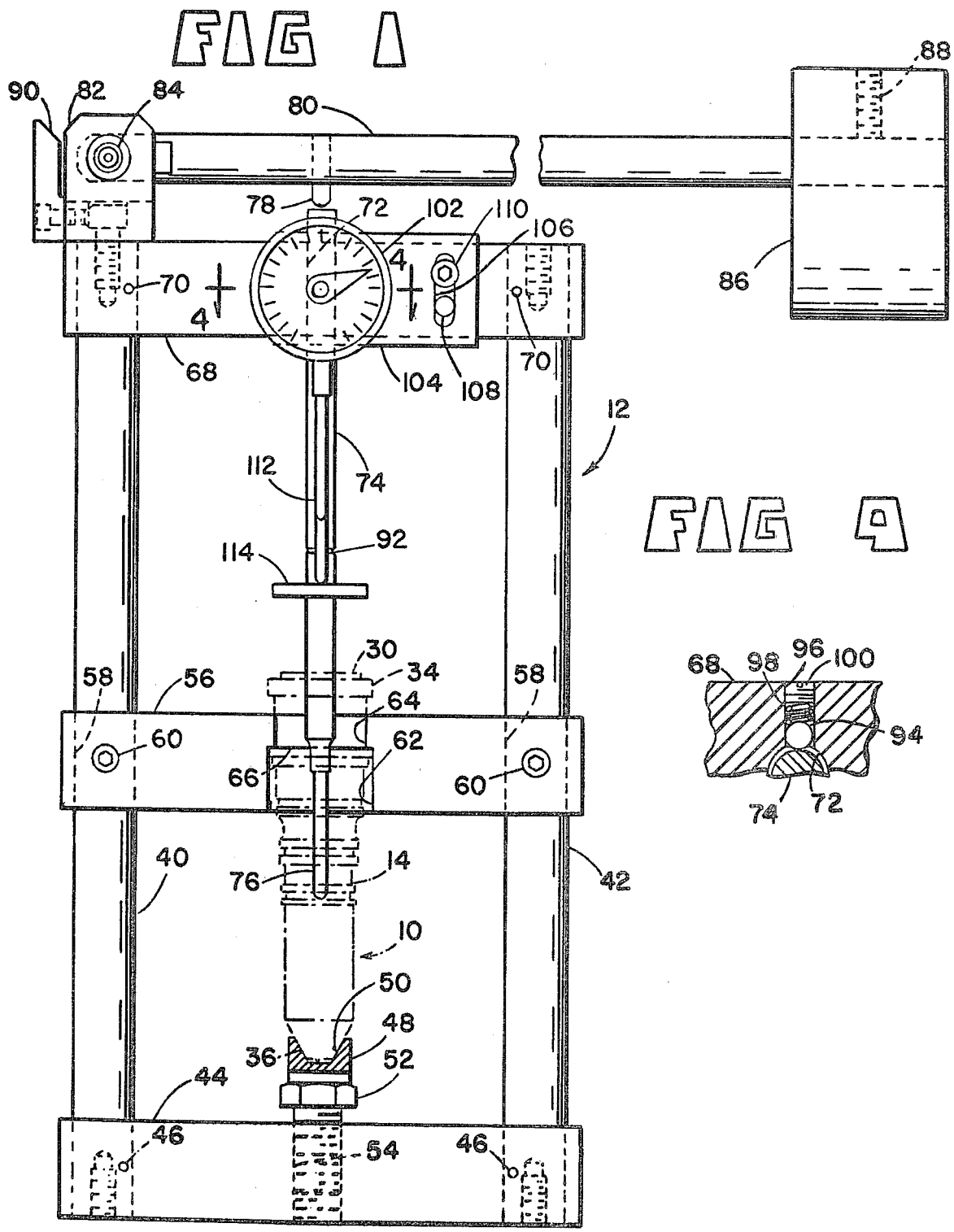

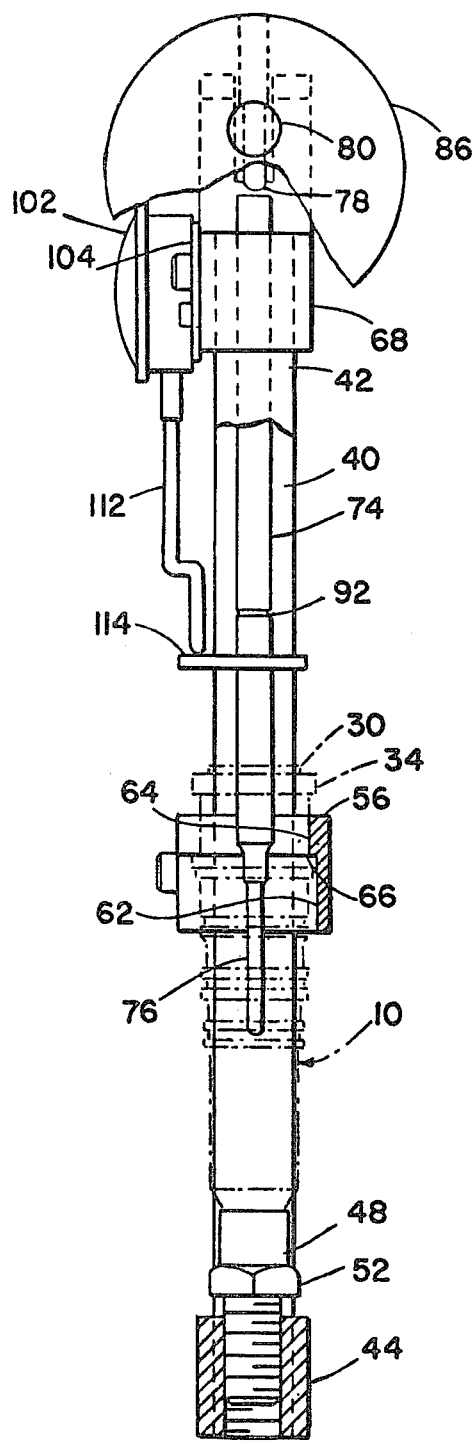
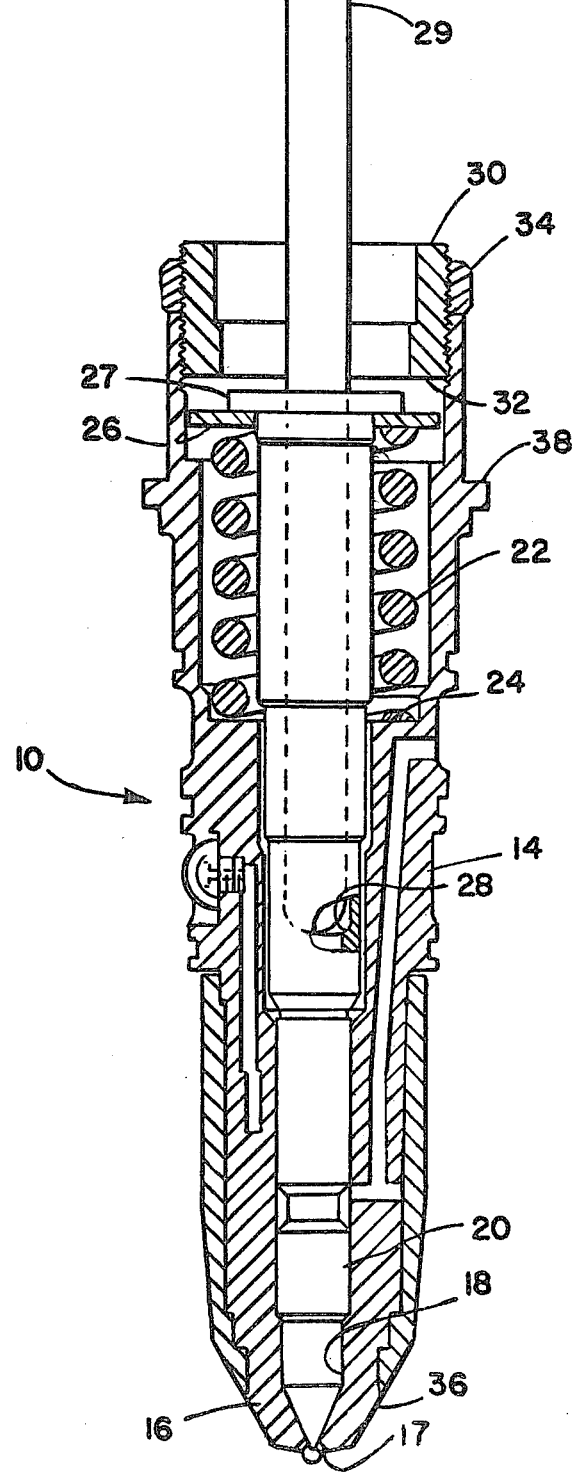

FUEL INJECTOR ADJUSTMENT FIXTURE

The present invention relates to adjustment fixtures and more particularly to adjustment fixtures for fuel injectors.

One type of fuel injector has been used quite extensively in diesel engine fuel systems. It is a unit injector in which a cam actuated plunger forces fuel from an injector directly into the combustion chamber of an engine. One type of injector typical of this may be found in the U.S. patent to Perr No. 3,351,288.

Recently it has been proposed to provide a stop which limits the upper displacement of the plunger for this type of injector. The position of the stop is adjusted so that when the plunger is raised to permit entry of a new charge of fuel into the chamber, it hits the stop and permits the inertia of the remainder of the injector actuating mechanism to momentarily loosen and thus permit the formation of an oil film at the interface between various components. The maintenance of this lubricating film assures long term durability and improved extended life fuel system performance.

Proper adjustment of the stop in this type of injector, however, becomes a difficult task. The injector components are extremely small and do not permit convenient and direct measurement of the plunger displacement to check the actual limit of travel. Furthermore, the spring which returns the plunger does not permit a direct manipulation of the plunger by an operator.

These problems are solved by apparatus for the adjustment of the above type of injector stop. The apparatus comprises a frame and means for releasably securing an injector in the frame. A rod is displaceable in the frame parallel to the displacement of the injector plunger and one end of the rod abuts the plunger. An arm has one end pivotally mounted to the frame and a predetermined weight at its opposite end. The arm abuts the opposite end of the rod at a point adjacent the pivotal mounting to produce a force multiplication on the rod when the end of the arm is manipulated. The linear displacement of the plunger is indicated so that the rod may be manipulated to a given position permitting a uniform adjustment of the stop.

The above and other related features of the present invention will be apparent from a reading of the following description of the disclosure shown in the accompanying drawings and the novelty thereof pointed out in the appended claims.

In the drawings:

FIG. 1 is a front elevational view of an injector adjustment fixture embodying the present invention along with an injector to be adjusted, FIG. 2 is a side elevational view of the injector fixture of FIG. 1 taken on lines 2—2 of FIG. 1, FIG. 3 is an enlarged longitudinal view of the injector used with the fixture of FIG. 1 and, FIG. 4 is an enlarged cross section view of the injector adjustment fixture of FIG. 1 taken on line 4—4 of FIG. 1.

Referring to FIGS. 1 and 2 there is shown an injector 10 of the type that is to be adjusted by a fixture generally indicated at 12. As seen in FIG. 3 the injector 10 comprises an elongated generally cylindrical housing 14 having a cup 16 at one end through which fuel is injected via ports 17 into the combustion chamber of an engine. The housing 14 has an inner elongated chamber 18 connected with the ports 17. A plunger 20 is displaceable in chamber 18 and is shown in its bottom-most position. A spring 22 acts between a shoulder 24 on housing 14 and a washer 26 abutting a flange 27 on the plunger 20. Spring 22 urges the plunger 20 towards its upper position.

A socket 28 in the plunger 20 receives a push rod 29 when installed in an engine to displace the plunger 20 downward to its illustrated position and force fuel from the lower part of chamber 18 through ports 17. Fuel is delivered to chamber 18 by suitable passages employing the principles discussed in the above mentioned patent. Details of these passages are not discussed to simplify the description of the present invention.

The upper end of the injector housing 14 has an adjustable stop in the form of a sleeve 30 threaded into the open upper end of injector 10. By rotating sleeve 30 the position of its lower face 32 may be varied to adjustably limit the upper travel of plunger 20. A lock nut 34 is threaded over sleeve 30 to lock it in a given position. A conical face 36 on injector cup 16 and a shoulder 38 adjacent its upper end provide the means by which the injector is mounted in an engine.

Fixture 12 of FIGS. 1, 2, and 4, is provided to accurately and predictably adjust the stop 30. Fixture 12 comprises a frame made up of two parallel rails 40 and 42. A lower cross bar 44 extends between the rails 40 and 42 and is secured to them by suitable pins 46. A cup 48 having a conical recess 50 corresponding to the face 36 on the injector cup 16 is secured to a bolt 52 threadedly received in a bore 54 through cross bar 44.

An intermediate cross plate 56 has a pair of through bores 58 at its ends through which the rails 40 and 42 extend. Cross bar 56 is permitted to slide along the rails 40 and 42 to permit installation of injector 10 and also to permit accomodation of injectors having differing overall lengths. Set screws 60 permit the cross bar 56 to be fixed in a desired position. Cross bar 56 has intersecting semi-circular recesses 62 and 64 which receive the upper end of injector 10. A shoulder 66 formed at the junction between recesses 62 and 64 receives shoulder 38 of injector 10. As a result the injector 10 is clamped between the cross bars 56 and 44.

An upper cross bar 68 extends between the upper ends of rails 40 and 42 and is held in place by pins 70. Cross bar 68 has an opening extending through it which has an axis coaxial with the axis of injector 10. An elongated rod 74 is received in opening 72 and has a lower tip section 76 received in socket 28 of the injector plunger 20 in place of the push rod 29 shown in FIG. 3. Rod 74 is contacted by the spherical head of a pin 78 mounted on an arm 80. Arm 80 is pivotally mounted on a rod 84 received in a forked support 82 which is mounted on cross arm 68. The free end of arm 80 has a weight 86 held in place by a set screw 88. As will be explained in detail below the distance between pin 78 and the rod 84 is substantially less than the distance between rod 84 and the weight 86. It has been found that a ratio of approximately $4\frac{1}{2}$ to 1 gives acceptable results. The arm 80 is pivotal in a counter clockwise direction to permit an upward movement of rod 74 during installation of an injector. A stop 90 mounted on fork support 82 permits the arm 80 to be maintained in the counter clockwise position.

A groove 92 is formed on rod 74 to permit it to be maintained out of the way during installation of an injector. Groove 92 forms a detent for a ball 94 received in a bore 96 extending from opening 72 (see FIG. 4).

The ball 94 is urged into the groove 92 by a spring 98 which also acts against a plug 100.

Movement of the plunger 20 is indicated by a suitable dial gauge 102 which is secured to a mounting bracket 104. Mounting bracket 104 has an elongated slot 106 which receives a pin 108 and a screw 110. Pin 108 and screw 110 restrain movement of the mounting bracket 104 to a direction parallel to the direction of movement of the rod 74. Dial indicator 102 has an indicating shaft 112 extending parallel to rod 74 and abutting a flange 114 on it.

To adjust the top stop on an injector 10 the arm 80 is pivoted to its clockwise position against stop 90 and rod 74 is elevated so that the ball 94 is received in groove 92 to maintain it in the elevated positon. Set screws 60 are loosened and cross bar 56 moved upwards if necessary so that injector 10 can be positioned between conical recess 50 and shoulder 66. When the injector is in place set screws 60 are tightened and nut 52 is rotated to tighten cup 48 against injector 10 with a given level of torque. This given level of torque is selected to apply a preload to the injector 10 that simulates the preload of the injector as actually installed in an engine.

When this is done the lock nut 34 is loosened to permit movement of sleeve 30 by hand. Rod 74 is lowered so that the lower tip section 76 seats in the socket 28 of plunger 20. The arm 80 is swung clockwise to the illustrated position and then depressed to bottom the plunger 20 in chamber 18 (the position shown in FIG. 3). Since the arm 80 is constructed to permit the application of a mechanical force advantage on rod 74, an operator can easily overcome the force of the return spring 22. In this position the dial indicator 102 is either set at "0" or the reading in that position noted.

The arm 80 then is raised so that the incremental upwards displacement of the dial indicator 102 equals the desired limit of travel of plunger 20. The arm 80 is held in this position by the operator while the sleeve 30 is rotated so that its lower face 32 abuts flange 26 on plunger 20. The point at which this occurs is easily observed by noting the beginning of movement of the dial indicator 102.

Once the sleeve 30 is in the desired position the arm 80 is released to be pushed to its elevated position by the injector return spring 32. The lock nut 34 is tightened and the arm 80 is lowered to bottom the plunger 20 again and released to determine whether the adjustment still falls within the required limit of travel. If it does not the foregoing procedure is repeated.

The provision of the predetermined weight 86 enables highly repeatable checks on the injector adjustment since it applies a uniform preload to the injector plunger 20 so the mating components are properly seated. This minimizes, if not eliminates, looseness or misalignment of parts that could affect the results.

The fixture 12 can accomodate injectors of varying heights. The spherical tip of pin 78 enables the uniform transmission of force from the arm 80 to rod 74 irrespective of the position of arm 80.

While a preferred embodiment of the present invention has been described it should be apparent that other modifications may be employed by those skilled in the art without departing from its spirit and scope.

Having thus described the invention what is claimed as novel and desired to be secured by letters patent of the United States is:

1. Apparatus for permitting the adjustment of a stop for a displaceable plunger of a fuel injector having an elongated housing, said plunger being displaceable parallel to the longitudinal axis thereof, said housing having a tip at one end and a shoulder adjacent the other end thereof, said apparatus comprising:

a frame comprising a pair of parallel rails and a first cross bar extending between the ends of said rails, said first cross bar having a bore therethrough parallel to said rails, means for releasably securing an injector in said frame;

a rod displaceable in said frame in a direction generally parallel to the direction of displacement of said injector plunger, one end of said rod abutting said plunger for displacement thereof and the other end extending through the bore in said first cross bar;

a spring loaded detent positioned in said first cross bar and engagable with a corresponding recess in said rod thereby permitting said rod to be maintained in an elevated position for installation of said injector;

an arm having one end pivotally mounted to said frame and a predetermined weight positioned at the opposite end of said arm, said arm abutting the opposite end of said rod at a point adjacent the pivot mounting to produce a force multiplication on said rod in response to movement of the opposite end of said rod;

a stop positioned on said first cross bar adjacent the pivotal mounting for said arm thereby permitting said arm to be swung out of contact with said rod when it is maintained in its upper position;

a flange positioned on said rod; and, a linear displacement indicating device positioned on said first cross bar and having a displacement sensing rod in contact with said flange for indicating the displacement thereof;

said releasable securing means comprising a pair of cross bars extending between said parallel rails generally at right angles to the axis of an injector to be tested, one of said bars being displaceable relative to the other and having two intersecting semicircular through bores of different diameters formed therein, said bores thereby defining a shoulder at the point where they intersect for receiving the shoulder on said injector housing and a cup receiving the tip of said injector housing, said cup being threadedly engaged with the other cross bar for clamping the opposite ends of said injector housing independent of the displacement of said rod with a predetermined preload simulating the preload of the injector installed in an engine, whereby said rod is actuated to displace said plunger to a given position permitting adjustment of said injector stop and said weight insures repeatable adjustment of said stop.

2. Apparatus as in claim 1 wherein said detent comprises a ball positioned in a bore intersecting the through bore in said first cross bar and a spring for yieldably urging said ball towards said through bore thereby maintaining it in contact with said rod.

* * * * *